A. W. BODELL.
INTERNAL COMBUSTION ENGINE.
APPLICATION FILED FEB. 25, 1918.
1,297,068.
Patented Mar. 11, 1919.
2 SHEETS—SHEET 1.
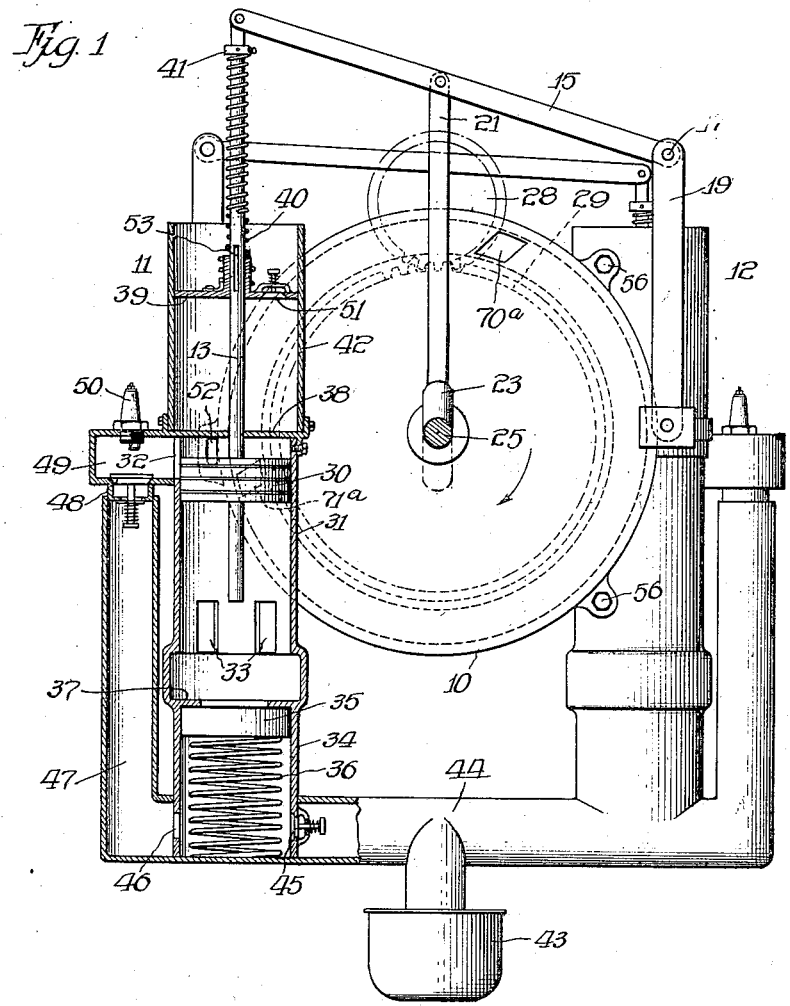
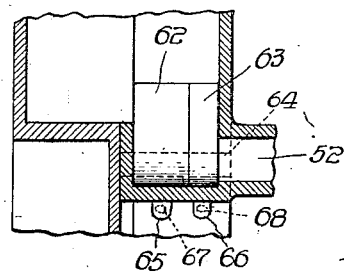
WITNESS
INVENTOR.
Allen W. Bodell.
BY
ATTORNEY A. W. BODELL.
INTERNAL COMBUSTION ENGINE.
APPLICATION FILED FEB. 25, 1918.
1,297,068.
Patented Mar. 11, 1919.
2 SHEETS—SHEET 2.
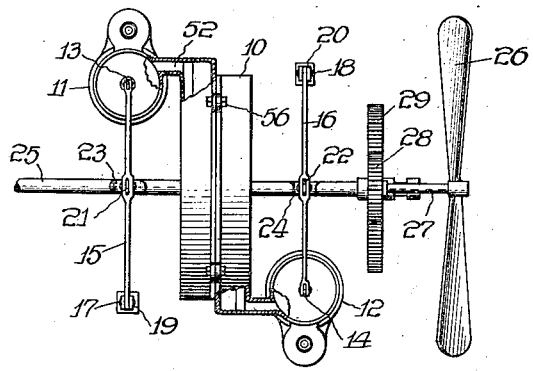
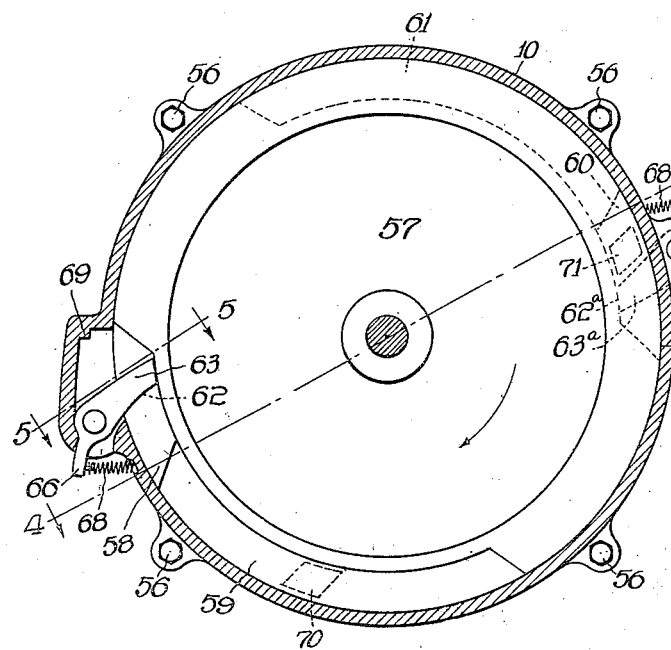
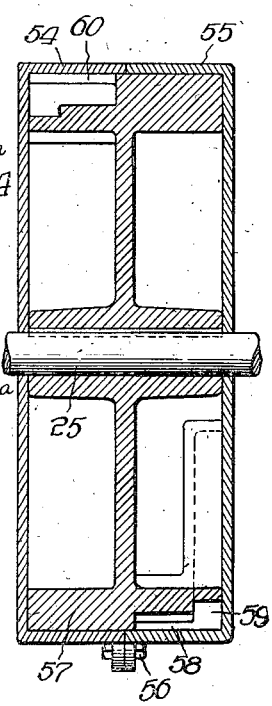
WITNESS
INVENTOR.
Allen W. Bodell
BY Albert C. Bell
ATTORNEY

UNITED STATES PATENT OFFICE.

ALLEN W. BODELL, OF WILMETTE, ILLINOIS.

INTERNAL-COMBUSTION ENGINE.

1,297,068.  Specification of Letters Patent.  Patented Mar. 11, 1919.

Application filed February 25, 1918. Serial No. 218,930.

*To all whom it may concern:*

Be it known that I, ALLEN W. BODELL, a citizen of the United States, residing at Wilmette, in the county of Cook and State of Illinois, have invented a certain new and useful Improvement in Internal-Combustion Engines, of which the following is a specification.

My invention relates to an internal combustion engine of the combined reciprocating and rotary type, the parts of which coöperate in such a manner that a single charge by the firing thereof, actuates both the reciprocating and rotary portions of the engine, as a result of which the rotary portion is effective with maximum efficiency in turning the shaft of the engine through the portion of its cycle of operation, for which the crank of the reciprocating portion of the engine is near its dead center position.

My invention further provides novel means for clearing the engine of the gases of combustion and supplying both portions of the engine with compressed explosive mixture for each rotation of the crank of the engine and therefore, for each complete stroke of the piston.

The several features characterizing my invention will best be understood by reference to the accompanying drawings showing a preferred embodiment thereof, which are as follows:

Figure 1 shows the complete engine in elevation, one of the cylinders being shown in vertical section to disclose the working parts, Fig. 2 shows the complete engine in plan view on a reduced scale, and shows also the manner of connecting the engine to devices to be driven thereby, Fig. 3 shows in elevation similar to Fig. 1 on a somewhat enlarged scale the rotary portion of the engine with the wall of the casing removed to show the working parts thereof, Fig. 4 is a sectional view of the parts shown in Fig. 3 taken along the line 4—4, and Fig. 5 is a detail sectional view of the parts shown in Fig. 3 taken along the line 5—5.

Similar numerals refer to similar parts throughout the several views.

As shown in Fig. 2 the engine consists of a rotary portion 10, and two cylinders 11 and 12, the cylinders being of the reciprocating type and having piston rods 13 and 14 connected with levers 15 and 16 pivotally supported at 17 and 18 from brackets 19 and 20 respectively, which in turn are supported from the base of the engine not shown. The levers 15 and 16 are pivotally connected with connecting rods 21 and 22, the other ends of which rods engage the cranks 23 and 24 on the crank shaft 25, which shaft extends centrally through the rotary portion 10 of the engine. The cranks 23 and 24 are preferably disposed opposite to each other, or in other words 180 degrees apart and the cylinders 11 and 12 are disposed upon opposite sides of the rotary portion 10 and 180 degrees apart, as a result of which a power impulse is imparted to the crank shaft 25 for each half rotation of the crank shaft. While the engine may be employed to drive any desired machines, a diagrammatic connection is indicated in Fig. 2 for driving a propeller 26 mounted on a shaft 27 in substantially the manner that the engine may be employed for aeroplane work, the shaft 27 being connected with the shaft 25 by the gears 28 and 29 carried by said shafts. As shown in Fig. 2 the ratio of the gears 28 and 29 is such as to drive the propeller 26 much faster than the rate of rotation of the crank shaft 25, thus providing that the engine may rotate at relatively slow speed and drive the propeller at the high rate of speed required for such work.

The cylinders 11 and 12 are identical in connection and the rotary portion 10 of the engine is of double construction so that it may coöperate in the same manner with each cylinder, whenever a charge is fired in either cylinder.

As shown in Fig. 1 the cylinder portion 11, which is shown in section is constructed as follows:

The piston rod 13 has rigidly secured thereto a working piston 30 in a power cylinder 31, which is provided with an intake port 32 and exhaust ports 33. A pumping cylinder 34 is supported in line with the cylinder 31 at the lower end thereof and contains a plunger or piston 35, which is held in the upper end of said pumping cylinder by a spring 36. The plunger 35 is free from the piston rod 13 and is operated only when the lower end of the piston rod which projects beyond the working piston 30, engages said plunger to force it downward against the action of the spring 36. An inwardly extending flange 37 projecting from the upper end of the pumping cylinder limits the upward motion of the plunger 35 under the action of the spring 36.

The piston rod 13 has mounted thereon above the cap 38 of the power cylinder 31 a plunger or piston 39, which is free to move on the piston rod 13 as permitted by the spring 40 surrounding the piston rod 13 and having its lower end connected to the said plunger 39. The other end of the spring 40 is rigidly secured by means of a collar 41 to the upper end of the piston rod 13. The plunger 39 is fitted in a cylinder 42 mounted upon the cap 38 of the working cylinder 31 in line with said working cylinder.

Explosive mixture is supplied to the engine in the following manner:

A carbureter 43 of any desired construction is connected with an intake manifold 44 provided with a puppet valve 45 adjacent to and communicating with the pumping cylinder 34 to admit the mixture supplied by the intake manifold to the pumping cylinder, when the spring 36 moves the plunger 35 to the position indicated in Fig. 1. The pumping cylinder is provided with an outlet port 46 communicating with a passageway 47, which in turn communicates through a puppet valve 48 with a firing chamber 49 in communication with the intake port 32 of the working cylinder 31. A spark plug 50 is mounted in the combustion chamber to fire the mixture at the proper time in any desired manner known to the art. The plunger 39 is provided with a puppet valve 51 for admitting air to the cylinder 42 when the plunger 39 is raised by the action of the spring 40 during an upstroke of the piston rod 13. With the parts in the position shown in Fig. 1 and assuming that a working charge has been communicated to the working cylinder 31 and properly compressed and fired and that the crank shaft is rotating in the direction of the arrow, the force of the combustion of the mixture drives the piston 30 downward at the same time communicating a rotary impulse to the rotary portion of the engine through a communicating port 52 in a manner to be described. By the downward motion of the piston rod 13, the spring 40 is placed under compression due to the compression of the air in the cylinder 42, which continues until the upper face of the working piston 30 passes below the upper portion of the exhaust ports 33 at which time a slot 53 extending through the piston rod 13 passes through the cap 38 of the working cylinder and permits the air compressed in the cylinder 42 to rush into the working cylinder and scavenge the same. At the time of the uncovering of the exhaust ports in the manner referred to the downward stroke of the working piston is not quite complete and when the working piston is moved to its lowermost position the air from the cylinder 42 serves to practically remove all of the gases of combustion from the working cylinder. The lower end of the piston rod 13 is so related to the plunger 35 that it engages the latter before the exhaust ports 33 are opened, as a result of which continued motion downward of the piston rod 13 moves the plunger 35 downward against the action of the spring 36, thus forcing the mixture previously pumped into the cylinder 34 by upward motion of the plunger, through the port 46, the passageway 47 and the valve 48 into the combustion chamber thus through the intake port into the working cylinder 31. The proportions of the pumping cylinder 34 are so taken and the stroke of the plunger 35 is so designed that the mixture forced from the cylinder 34 by each downward stroke of the piston rod 13 is sufficient to supply the working cylinder 31 with a proper amount of mixture for the next charge. The carbureter 43 is preferably adjusted so that the air retained in the working cylinder 31, after the scavenging operation will combine with the mixture delivered to the working cylinder to effect its next power stroke to produce a proper working mixture, as a result of the combination of the air in the working cylinder with the mixture supplied thereto. During the upward motion of the piston rod from its lowermost position, the plunger 35 is moved upwardly by the action of the spring 36, thus drawing into the pumping cylinder 34 more of the mixture from the intake manifold 44, since at this time the puppet valve 48 is closed, and as a result of the compression of the spring 40 at this time the plunger 39 is held against the cap 38 until the slot 53 has been raised above the lower face of the plunger 39, after which continued motion in an upward direction of the piston rod 13 raises the plunger 30 and air is drawn into the cylinder 42 through the puppet valve 51. As soon as the lower end of the slot 53 is raised above the inner face of the cap 38 compression of the next working charge begins which compression is completed when the working piston 30 reaches the position indicated in Fig. 1 and thereupon the compressed charge is fired and the cycle described is repeated. By placing the cylinder portions 11 and 12 on opposite sides of the crank shaft 25 and displacing the cycles of operation of the two cylinder portions 180 degrees a power impulse is communicated to the crank shaft 25 by the cylinder portions for each half rotation of the crank shaft.

As shown in Figs. 3 and 4 the rotary portion 10 of the engine comprises a cylindrical casing made preferably in two sections 54 and 55 secured together in any suitable manner, as for example by bolts 56, and in this casing a rotary element 57 is disposed, which element is rigidly secured to the crank shaft 25 in any desired manner so as to rotate therewith. The element 57 is made to accurately fit the bore of the casing and this element is constructed in the following manner to receive power impulses simultaneously with the exertion of the power impulses on the piston rods of the reciprocating portion of the engine, as follows:

The rim of the rotary member is relatively heavy and has formed in its outer face segmental grooves 58, 59, 60 and 61, the grooves 58 and 60 being of similar conformation and oppositely disposed in the rim of the element 57 while the grooves 59 and 61 are also of similar conformation and oppositely disposed in said rim. The grooves 58 and 59 are of the same depth, but the groove 59 is considerably narrower than the groove 58. The groove 59 extends from one edge of the element 57 somewhat less than one half of the distance to the central plane of the element 57 and at one end is in communication with the groove 58, which extends from the same edge of the element 57 nearly to the middle plane of the rotary element. As shown more clearly in Fig. 5, two dogs 62 and 63 are pivotally mounted on a rod 64 and free to turn so as to enter the grooves 58 and 59 respectively, the dog 63 being of a thickness equal to the width of the groove 59 and the dog 62 being equal to the remaining width of the groove 58, as a result of which the combined thickness of the dogs 62 and 63 is equal to the full width of the groove 58. The dogs 62 and 63 are of substantially the same conformation, the only difference in them being in thickness, and they are provided with lugs 65 and 66 projecting through the casing to engage springs 67 and 68 for moving the dogs into the grooves when rotation of the element 57 permits. The dogs are accurately fitted so as to make practically gas tight joints with the surfaces engaged by them, as a result of which they coöperate with the grooves 58 and 59 in a manner so that the introduction of gases under pressure between the ends of the grooves and the dogs imparts a rotary force to the element 57. The dogs 62 and 63 are mounted in an extension of the casing so that when the element 57 is rotated to move the grooves 58 and 59 beyond them, the dogs are moved into the extension of the casing and their ends rest on the outer cylindrical surface of the element 57, in which position they remain until the grooves again come opposite them. The extension of the casing is provided with a shoulder 69 for preventing outward motion of the dogs beyond a point sufficient to clear the outer cylindrical surface of the element 57.

As indicated in Fig. 5 the port 52 extending from the upper end of the cylinder 31 communicates with the casing of the rotary portion of the engine adjacent the dogs 62 and 63. In Fig. 3 the side wall of the casing toward the observer is removed to facilitate showing the interior construction of the rotary portion of the construction of the engine and the removed side contains the ports provided to coöperate with the grooves 58 and 59. Since the oppositely disposed grooves in the member 57 are of the same construction and operate in the same manner, the arrangement of the ports employed in connection with the rotary portion of the engine will be understood by reference to the grooves 60 and 61, it being understood that similar ports are provided for the grooves 58 and 59 in the wall of the casing, which is not shown in Fig. 3. The admission port $52^a$, it will be noted extends beyond the shoulder $69^a$ provided to limit the motion of the dogs $62^a$ and $63^a$, as a result of which when a charge is fired in the cylinder portion 12 pressure is communicated through the port $52^a$ to the outer surface of the dogs $62^a$ and $63^a$ and assuming that they have not yet moved to the position indicated in Fig. 3 the pressure thus exerted in addition to the action of the springs $67^a$ and $68^a$ at once moves them to the position indicated in Fig. 3 for at this time the grooves 60 and 61 have been advanced by the rotation of the shaft 25 to a position permitting the dogs to enter the leading end of the groove 60. The force produced by the combustion of the mixture is thus exerted on the dogs $62^a$ and $63^a$ on one hand, and on the lower end of the groove 60 on the other hand, and a rotary force is communicated to the element 57, which condition continues until the trailing end of the groove 60 engages the dog $62^a$ and moves said dog into the extension of the casing provided to receive it. The groove 60 is of relatively short length circumferentially of the element 57, and the dog $63^a$ remains in the operative position described for a considerably longer time and until the trailing end of the groove 61 engages said dog to move it into the extension of the casing provided to receive it. During the entire time that the dog $63^a$ is in the groove 61 pressure is communicated through the port $52^a$ from the working cylinder of the cylinder portion 12 and at substantially the time that the exhaust ports of said working cylinder are opened by the working piston, the leading end of the groove 60 comes opposite the exhaust port 70 formed through the far wall of the casing as indicated in Fig. 3, and as a result a considerable portion of the gases of combustion contained in the grooves 60 and 61 is exhausted from said grooves. A portion of said gases, however, is not exhausted and is trapped in said grooves by continued rotation of the element 57 without, however, interfering with the operation of the mechanism in any way, and these remaining gases are exhausted from the grooves during the next rotary impulse produced in the said grooves as follows:

When the leading end of the groove 60 is advanced to a position permitting the dogs 62ª and 63ª to enter said groove and the next working charge is fired the groove 60 is in communication with an exhaust port 71 formed through the far wall of the casing for the arrangement of parts shown in Fig. 3, which exhaust port is immediately to the rear of the dogs 62ª and 63ª in their operative position, and as the element 57 continues to rotate, the gases which would otherwise be compressed in the grooves 60 and 61 are exhausted through the exhaust port 71 by the said continued rotation. The location of the corresponding exhaust ports for the grooves 58 and 59 is indicated in Fig. 1 at 70ª and 71ª.

It will be observed that at the time of the firing of a charge in either of the reciprocating portions of the engine the crank on the crank shaft coöperating with said reciprocating portion is at or near its dead center position, and that, therefore, the force communicated at that time by the working charge to the crank shaft is communicated at a considerable disadvantage which is not overcome until the crank shaft has advanced sufficiently to bring the crank nearly to its right angle position to the corresponding connecting rod. At the time of the firing of the working charge, however, through the coöperation of the rotary portion of the engine the force of the combustion is at once communicated with maximum effectiveness to the rotary portion of the engine, since the latter operates at all times with a leverage on the crank shaft equal to the mean radius of the grooves receiving the gases of combustion, and furthermore that the greater part of the work performed by the rotary portion of the engine is done during the early portion of the burning of the charge, since at that time the opportunity for expansion of the gases of combustion in the rotary portion of the engine is relatively great as compared with the opportunity of expansion of the burning gases in the reciprocating portion of the engine. When, however, the moving parts have advanced sufficiently to produce a relatively rapid displacement of the working piston in the reciprocating portion of the engine the opportunity for the gases of combustion to expand in the working cylinder is relatively great, as compared with the opportunity for expansion in the rotary portion of the engine, thus the two portions coöperate in a manner to produce a smooth, practically uniform turning moment on the crank shaft during the entire portion of the cycle that the charge is being burned, and its expansive effort is exerted on the moving parts of the engine. The grooves 58 and 60 are of relatively large width to utilize to the fullest possible extent the force of the gases of combustion during the first part of the period of combustion, and the narrower grooves are employed during the latter portion of the combustion to permit the reciprocating portion of the engine to have the maximum possible effect of the gases of combustion at the time that the cranks are in position to most effectively communicate the force developed to the crank shaft. It is to be noted that my improved engine construction is not merely a connecting of a reciprocating engine with a rotary engine, but on the other hand that it is a combined engine in which a reciprocating portion coöperates with a rotary portion, in such a manner that a common charge operates both by the firing of said charge, and that the rotary portion and the reciprocating portion are so related and combined that each supplements the other in the most effective manner to utilize to the fullest extent the available energy resulting from the firing of a single charge.

My invention further provides novel features of construction pertaining to both the reciprocating portion and the rotary portion of the engine, regardless of whether said portions are employed in combination or not, since each portion is capable of operation independently of the other, although when independently operated, as high a degree of efficiency cannot be realized as when they are operated in combination in the manner above described.

While I have shown my invention in the particular embodiment above described, I do not, however, limit myself to this exact construction as I may employ any equivalents thereof, known to the art at the time of the filing of this application, without departing from the scope of the appended claims.

What I claim is:

1. In an internal combustion engine, the combination of a rotary portion comprising a casing and rotary element, a reciprocating portion comprising a working cylinder and a working piston, a port connecting said casing and cylinder to simultaneously communicate driving effort to said element and the piston, said element having two grooves formed therein, one of said grooves being relatively wide and short, and the other of said grooves communicating with said first groove being relatively long and narrower, two movable dogs carried by said casing, one of said dogs being of a width equal to the narrower groove, and the combined width of said dogs being equal to the wider groove, and means for firing a charge and communicating the gases of combustion to said working piston and to said casing between the end of said grooves and said dogs, said rotary element and working piston being timed relatively to each other so that both of said dogs are operative during the initial portion of the power stroke of said working piston and only one of said dogs is operative during the remaining portion of said power stroke.

2. In an internal combustion engine, the combination of a rotary portion comprising a casing and rotary element, a reciprocating portion comprising a working cylinder and a working piston, a port connecting said casing and cylinder to simultaneously communicate driving effort to said element and the piston, said element having two grooves formed therein, one of said grooves being relatively wide and short, and the other of said grooves communicating with said first groove being relatively long and narrower, two movable dogs carried by said casing, one of said dogs being of a width equal to the narrower groove, and the combined width of said dogs being equal to the wider groove, and means for firing a charge and communicating the gases of combustion to said working piston and to said casing between the end of said grooves and said dogs, for each rotation of the said element, said rotary element and working piston being timed relatively to each other so that both of said dogs are operative during the initial portion of the power stroke of said working piston and only one of said dogs is operative during the remaining portion of said power stroke.

3. In an internal combustion engine, the combination of a rotary portion comprising a casing and rotary element, a reciprocating portion comprising a working cylinder and a working piston, a port connecting said casing and cylinder to simultaneously communicate driving effort to said element and the piston, said element having two grooves formed therein, one of said grooves being relatively wide and short, and the other of said grooves communicating with said first groove being relatively long and narrower, two movable dogs carried by said casing, one of said dogs being of a width equal to the narrower groove, and the combined width of said dogs being equal to the wider groove, and means for firing a charge and communicating the gases of combustion to said working piston and to said casing between the end of said grooves and said dogs, said casing having an exhaust port communicating with said grooves at the end of the driving impulse of said charge on said element, said rotary element and working piston being timed relatively to each other so that both of said dogs are operative during the initial portion of the power stroke of said working piston and only one of said dogs is operative during the remaining portion of said power stroke.

4. In an internal combustion engine, the combination of a rotary portion comprising a casing and rotary element, a reciprocating portion comprising a working cylinder and a working piston, a port connecting said casing and cylinder to simultaneously communicate driving effort to said element and the piston, said element having a groove for receiving expansive gases, a movable dog carried by said casing for entering and closing said groove, and means for firing the mixture and communicating the gases of combustion simultaneously to said working piston and through said port to said casing between the end of said groove and said dog, said casing having an exhaust port communicating with said groove at the end of the driving impulse of said charge on said element, and a second exhaust port adjacent said dog for scavenging said groove of the gases of combustion remaining therein.

5. In an internal combustion engine, the combination of a rotary portion comprising a casing and rotary element, a reciprocating portion comprising a working cylinder and a working piston, a port connecting said casing and cylinder to simultaneously communicate driving effort to said element and the piston, said element having two grooves formed therein, one of said grooves being relatively wide and short, and the other of said grooves communicating with said first groove being relatively long and narrower, two movable dogs carried by said casing, one of said dogs being of a width equal to the narrower groove, and the combined width of said dogs being equal to the wider groove, and means for firing a charge and communicating the gases of combustion to said working piston and to said casing between the end of said grooves and said dogs, said casing having an exhaust port communicating with said grooves at the end of the driving impulse of said charge on said element, and a second exhaust port adjacent said dogs for scavenging said grooves of the gases of combustion remaining therein, said rotary element and working piston being timed relatively to each other so that both of said dogs are operative during the initial portion of the power stroke of said working piston and only one of said dogs is operative during the remaining portion of said power stroke.

6. In an internal combustion engine, the combination of a rotary portion comprising a casing and rotary element, a reciprocating portion comprising a working cylinder and a working piston, a port connecting said casing and cylinder to simultaneously communicate driving effort to said element and the piston, said element having two grooves formed therein, one of said grooves being relatively wide and short, and the other of said grooves communicating with said first groove being relatively long and narrower, two movable dogs carried by said casing, one of said dogs being of a width equal to the narrower groove, and the combined width of said dogs being equal to the wider groove, and means for firing a charge and communicating the gases of combustion to said working piston and to said casing between the end of said grooves and said dogs, said casing having an exhaust port adjacent said dogs for communicating with said grooves and scavenging said grooves of the gases of combustion remaining therein, said rotary element and working piston being timed relatively to each other so that both of said dogs are operative during the initial portion of the power stroke of said working piston and only one of said dogs is operative during the remaining portion of said power stroke.

7. In an internal combustion engine, the combination of a rotary portion comprising a casing and a rotary element, a reciprocating portion comprising a working cylinder and a working piston, a port connecting said casing and cylinder to simultaneously communicate driving effort to said element and the piston, said working cylinder having exhaust ports opened by said working piston for each power stroke thereof, a pumping cylinder, a plunger in said cylinder, means for supplying said pumping cylinder with an explosive mixture, a spring for holding said plunger at one end of said cylinder, mechanism carried by said piston for intermittently operating said plunger and a communicating passageway between said pumping cylinder and said working cylinder, whereby operation of said plunger supplies said working cylinder and said rotary portion simultaneously with a mixture of combustible gases for each stroke in the same direction of said working piston.

8. In an internal combustion engine, the combination of a rotary portion comprising a casing and a rotary element, a reciprocating portion comprising a working cylinder and a working piston, a port connecting said casing and cylinder to simultaneously communicate driving effort to said element and the piston, said working cylinder having exhaust ports opened by said working piston for each power stroke thereof, a pumping cylinder, a plunger in said cylinder, means for supplying said pumping cylinder with an explosive mixture, a spring for holding said plunger at one end of said cylinder, mechanism carried by said piston for intermittently operating said plunger and a communicating passageway between said pumping cylinder and said working cylinder, whereby operation of said plunger supplies said working cylinder and said rotary portion simultaneously with a mixture of combustible gases for each stroke in the same direction of said working piston, an auxiliary cylinder in line with said working cylinder, a piston rod connected with said working piston and extending through said auxiliary cylinder, a plunger loosely mounted on said piston rod in said auxiliary cylinder, a spring connecting said plunger in said auxiliary cylinder with said piston rod, and a port in said piston rod for communicating air compressed in said auxiliary cylinder to said working cylinder at the end of a power stroke of said working piston, and valve mechanism for admitting air to said auxiliary cylinder.

9. In an internal combustion engine, the combination of a rotary portion comprising a casing and a rotary element, a reciprocating portion comprising a working cylinder and a working piston, a port connecting said casing and cylinder to simultaneously communicate driving effort to said element and the piston, said working cylinder having exhaust ports opened by said working piston for each power stroke thereof, a combustion chamber in communication with said working cylinder, means for supplying said combustion chamber with a mixture of combustible gases for each stroke in the same direction of said working piston, an auxiliary cylinder in line with said working cylinder, a piston rod connected with said working piston and extending through said auxiliary cylinder, a plunger loosely mounted on said piston rod in said auxiliary cylinder, a spring connecting said plunger in said auxiliary cylinder with said piston rod, and a port in said piston rod for communicating air compressed in said auxiliary cylinder to said working cylinder at the end of a power stroke of said working piston, and valve mechanism for admitting air to said auxiliary cylinder.

10. In an internal combustion engine, the combination of a casing, a rotary element in the casing having two grooves formed therein, one of said grooves being relatively wide and short, and the other of said grooves communicating with said first groove being relatively long and narrower, two movable dogs carried by said casing, one of said dogs being of a width equal to the narrower groove, and the combined width of said dogs being equal to the wider groove, and means for firing a charge and communicating the gases of combustion to said casing between said dogs and the end of said grooves, both of said dogs being operative during the initial portion of the firing of said charge and but one of said dogs being operative during the remainder of the firing of said charge.

11. In an internal combustion engine, the combination of a casing, a rotary element in the casing having two grooves formed therein, one of said grooves being relatively wide and short, and the other of said grooves communicating with said first groove being relatively long and narrower, two movable dogs carried by said casing, one of said dogs being of a width equal to the narrower groove, and the combined width of said dogs being equal to the wider groove, and means for firing a charge and communicating the gases of combustion to said casing between said dogs and the end of said grooves, said casing having an exhaust port communicating with said grooves at the end of the driving impulse of said charge on said element, both of said dogs being operative during the initial portion of the firing of said charge and but one of said dogs being operative during the remainder of the firing of said charge.

12. In an internal combustion engine, the combination of a casing, a rotary element in the casing having two grooves formed therein, one of said grooves being relatively wide and short, and the other of said grooves communicating with said first groove being relatively long and narrower, two movable dogs carried by said casing, one of said dogs being of equal width to the narrower groove, and the combined width of said dogs being equal to the wider groove, means for firing a charge and communicating the gases of combustion to said casing between said dogs and the end of said grooves, said casing having an exhaust port communicating with said grooves at the end of the driving impulse of said charge on said element, and a second exhaust port adjacent said dogs for scavenging said grooves of the gases of combustion remaining therein, both of said dogs being operative during the initial portion of the firing of said charge and but one of said dogs being operative during the remainder of the firing of said charge.

13. In an internal combustion engine, the combination of a casing, a rotary element in the casing having two grooves formed therein, one of said grooves being relatively wide and short, and the other of said grooves communicating with said first groove being relatively long and narrower, two movable dogs carried by said casing, one of said dogs being of equal width to the narrower groove, and the combined width of said dogs being equal to the wider groove, means for firing a charge and communicating the gases of combustion to said casing between said dogs and the end of said grooves, said casing having an exhaust port adjacent said dogs for communicating with said grooves and scavenging said grooves of the gases of combustion contained therein, both of said dogs being operative during the initial portion of the firing of said charge and but one of said dogs being operative during the remainder of the firing of said charge.

14. In an internal combustion engine, the combination of a casing, a rotary element in the casing having two grooves formed therein, one of said grooves being relatively wide and short, and the other of said grooves communicating with said first groove being relatively long and narrower, two movable dogs carried by said casing, one of said dogs being of a width equal to the narrower groove, and the combined width of said dogs being equal to the wider groove, means for firing a charge and communicating the gases of combustion to said casing between said dogs and the end of said grooves, a shaft secured to said rotary element, a combustion chamber, and pumping mechanism operatively related to said shaft for delivering combustible gas under pressure to said chamber prior to the firing of the charge, both of said dogs being operative during the initial portion of the firing of said charge and but one of said dogs being operative during the remainder of the firing of said charge.

In witness whereof, I hereunto subscribe my name this 22nd day of February, A. D. 1918.

ALLEN W. BODELL.